(12) United States Patent
Zajac

(10) Patent No.: US 10,561,960 B2
(45) Date of Patent: Feb. 18, 2020

(54) METHOD AND APPARATUS FOR PURIFYING WATER, POTABLE SPIRITS AND ESSENTIAL OILS

(71) Applicant: Jonathan S. Zajac, Manchester, NH (US)

(72) Inventor: Jonathan S. Zajac, Manchester, NH (US)

(*) Notice: Subject to any disclaimer, the term of this patent is extended or adjusted under 35 U.S.C. 154(b) by 366 days.

(21) Appl. No.: 15/428,937

(22) Filed: Feb. 9, 2017

(65) Prior Publication Data

US 2017/0225095 A1    Aug. 10, 2017

Related U.S. Application Data

(60) Provisional application No. 62/293,221, filed on Feb. 9, 2016.

(51) Int. Cl.
| | |
|---|---|
| *B01D 3/00* | (2006.01) |
| *B01D 1/02* | (2006.01) |
| *B01D 1/00* | (2006.01) |
| *B01D 5/00* | (2006.01) |

(52) U.S. Cl.
CPC ............ *B01D 3/001* (2013.01); *B01D 1/0011* (2013.01); *B01D 1/02* (2013.01); *B01D 5/006* (2013.01); *B01D 5/0006* (2013.01)

(58) Field of Classification Search
CPC ...... B01D 1/0011; B01D 1/02; B01D 5/0006; B01D 5/006; B01D 3/02; B01D 3/04; B01D 3/001–005
See application file for complete search history.

(56) References Cited

U.S. PATENT DOCUMENTS 1,449,313 A * 3/1923 Bollmann ................ B01D 1/02
                                                              159/13.1

OTHER PUBLICATIONS

Mountain Moonshine, http://www.mountainmoonshine.com/productsrecipehistory.html, available publicly as of Jan. 24, 2015 per waybackmachine.com. (Year: 2015).*

* cited by examiner

*Primary Examiner* — Renee Robinson
*Assistant Examiner* — Derek N Mueller
(74) *Attorney, Agent, or Firm* — Z IP Law PLLC

(57) ABSTRACT

A distillation apparatus and method of more rapidly purifying water, potable spirits and essential oils and more specifically to a unique heat distribution device referred to herein as the flame flow that provides for the contents of the apparatus to reach evaporation temperatures more quickly and maintain temperature to provide better control and more evenly heat the contents of a distillation apparatus.

18 Claims, 14 Drawing Sheets

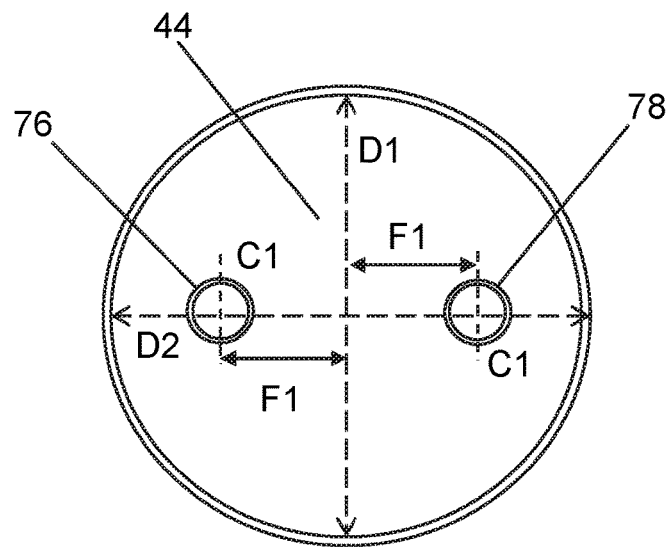
FIG. 4A
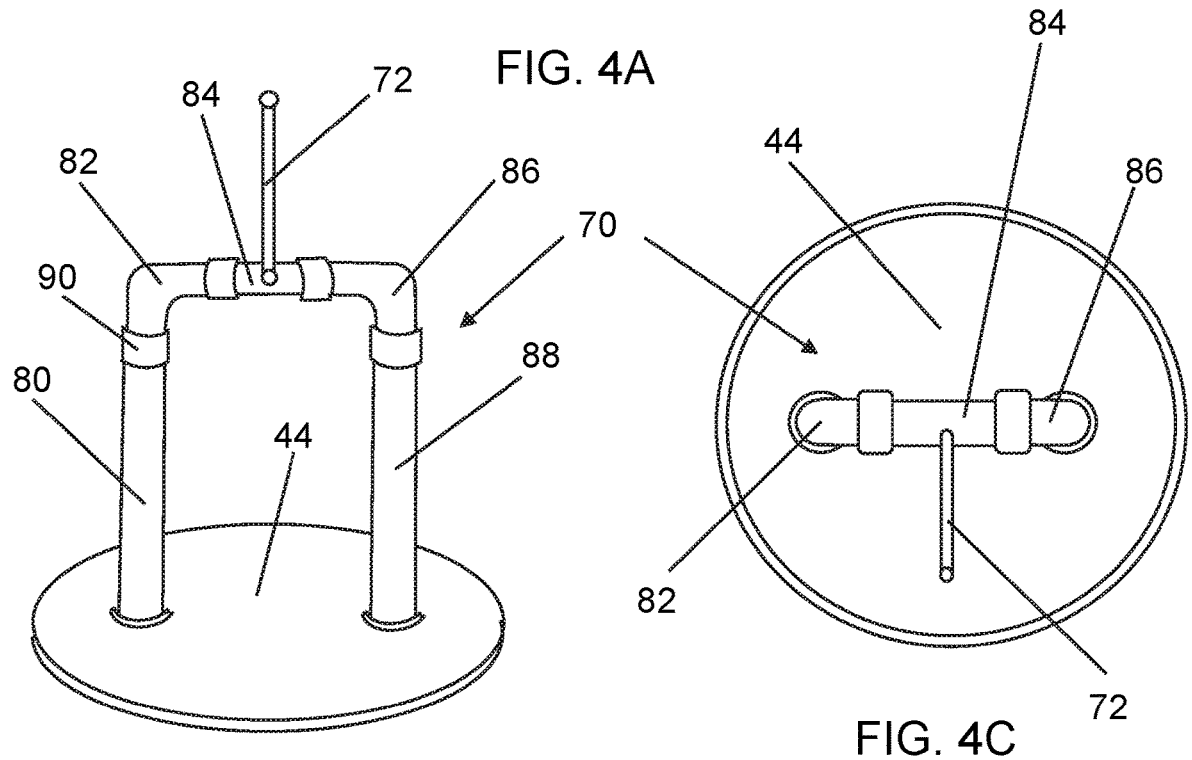
FIG. 4B
FIG. 4C

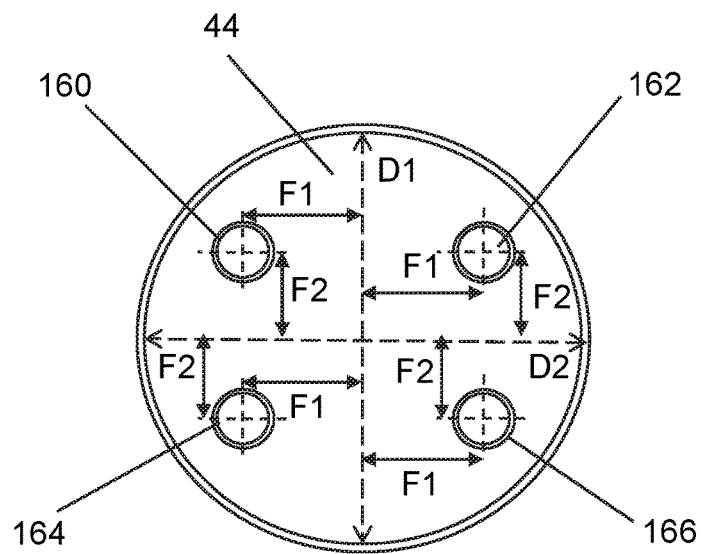
FIG. 13A
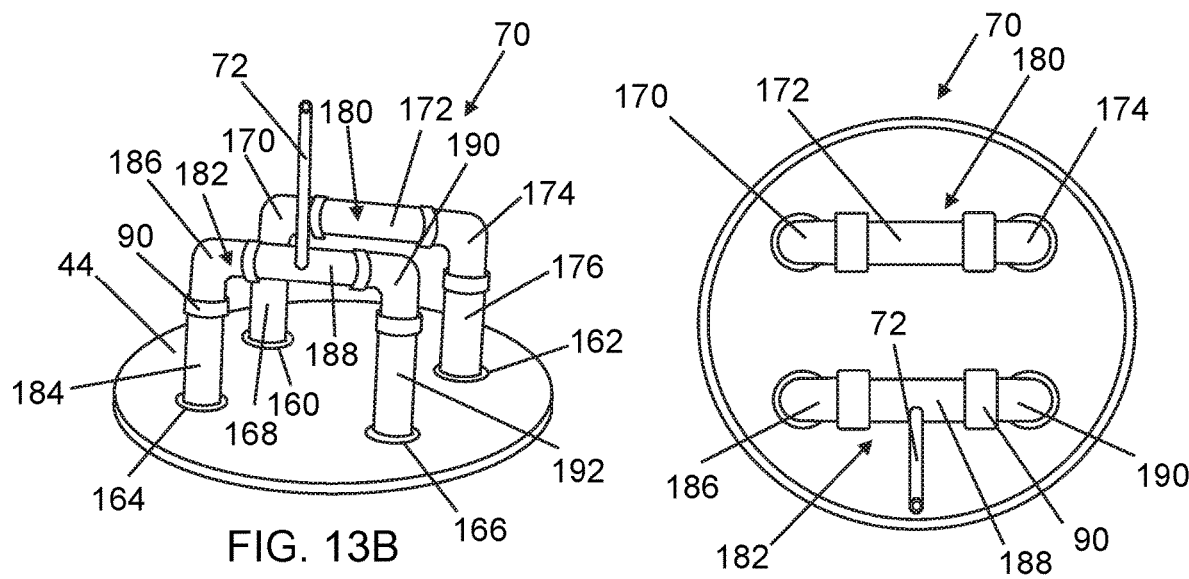
FIG. 13B
FIG. 13C

METHOD AND APPARATUS FOR PURIFYING WATER, POTABLE SPIRITS AND ESSENTIAL OILS

RELATED PATENT APPLICATIONS

This application claims the benefit of U.S. Provisional Patent Application No. 62/293,221 filed Feb. 9, 2016 entitled METHOD AND APPARATUS FOR PURIFYING WATER, POTABLE SPIRITS AND ESSENTIAL OILS which is hereby incorporated herein by reference in their entireties.

FIELD OF THE INVENTION

The invention relates to a distillation apparatus and method of more rapidly purifying water, potable spirits and essential oils and more specifically to a unique heat distribution device referred to herein as the flame flow that provides for the contents of the apparatus to reach evaporation temperatures more quickly and maintain temperature to provide better control and more evenly heat the contents of a distillation apparatus. By more quickly reaching evaporation temperatures, greater amounts of liquid may be distilled in much shorter periods of time which may be very beneficial when for example contaminated water must be distilled to be drinkable and useable. By maintaining temperatures and evenly heating, the flame flow prevents or reduces scorching of the contents which provides an improvement in quality over current distillation methodologies particularly in the production of potable spirits or essential oils.

BACKGROUND OF THE INVENTION

The use of distillation equipment to purify water, to manufacture potable spirits such as whiskies, brandies, rums, wine, beer and other alcoholic beverages and to produce essential oils is well known. In recent events including a chemical spill in West Virginia, the contamination of water supplies has effected hundreds of thousands of people resulting in an increased interest in devices that can quickly heat and purify water to produce drinkable water from contaminated supplies. In some instances, distilling water is a more effective means to purify water, where simply boiling water may not adequately remove all contaminants. Depending on the amount of distilled water or other product that must be produced, the distillation equipment may be of various sizes. For example, the distillation equipment may be a distillation apparatus of a copper pot type that may be available in volumes that range from about 1 gallon to more than 100 gallons. Copper is used and preferred as the material for distillation equipment because of its anti-corrosive properties allowing for copper distillation equipment to be used and stored out of doors and be resistant to harsh weather. Copper is also an excellent conductor of heat and evenly transfers heat to sufficiently heat the contents of the distillation apparatus to evaporation temperatures and also effectively cool down the vapor to maximize condensation and the collection of the distilled liquid. The heat transfer of copper is also significantly superior to stainless steel where copper exhibits improved anti-microbial properties over stainless steel. Copper also absorbs sulfur compounds and yeast cells produced during fermentation and prevents the production of ethyl carbonate, a toxic chemical formed from cyanides. Copper is also very malleable so easier to form in creative designs and shapes as desired. Copper also improves the final aroma and quality of the finished product.

To heat a distillation apparatus of a copper pot type, the flat base of the pot of the distillation apparatus is placed over an open flame, on an electric heating device, on a propane grill, heated using a propane torch or positioned on another type of heating element. Because copper is an excellent conductor of heat, the flame or heating element will readily heat the interior surface area of the base and the cylindrical sidewalls of the copper pot. Along these surfaces, heat will be transferred to the contents at the bottom of the pot and along the edges and over a period of time the contents within the center of the pot will begin to heat. At the top of the pot and along the condenser tube, thermometers may be placed to measure the temperature during vaporization. A collection vessel is placed at the end of the condenser tube to collect the distilled liquid.

In brewing potable spirits, a particular spirit is prepared by adequately fermenting a mash from a suitable type of grain over a number of hours or days. The mash is then heated in a distillation apparatus to remove ethyl alcohol through vaporization from the mash. The amount of time required to heat the mash to the temperatures necessary are dependent on the type of distillation equipment, the type of heating element and the amount of mash within the distillation apparatus. As an estimate it can take about 1 hour per 3.78 Liter (1 gallon) to reach an initial plateau of 64.4° Celsius (148° Fahrenheit) at which temperature methanol and other impurities that are toxic are vaporized from the mash. It is important that the mash is heated thoroughly at these temperatures to effectively remove the methanol and other toxins. When the toxins have burned off, the temperature within the pot climbs to a temperature of between 78.8° C. (174° F.) and below 100° C. (212° F.) the boiling temperature of water and ethanol alcohol begins to vaporize. The evaporation temperature to vaporize the ethanol is dependent upon the amount of ethanol within the mash solution where pure ethanol will boil at 78.8° C. (174° F.) but a 50/50% solution of ethanol and water will boil at 82.2° C. (180° F.) and a solution of 10% ethanol and 90% water will boil at 91.6° C. (197° F.). Temperatures within this range are maintained over a number of hours to thoroughly vaporize the ethanol from the mash and produce the expected percent alcohol by volume for the desired potable spirit. The evaporated ethyl alcohol is then condensed to collect the alcohol in liquid form. Different types of grains and other ingredients provide different types and flavorings of the potable spirit.

Essential oils are similarly extracted from flowers and other plants by placing the plant material in a grid within the pot of the distillation apparatus and placing water into the bottom of the pot below the grid. As the pot is heated and water evaporates, steam is forced through the plant material to break down volatile constituents that are vaporized and condensed with the water vapor. The liquid solution is then collected and because water and the essential oils don't mix, the essential oils float on top of the water or sink to the bottom below the water to be siphoned off and be collected. In producing potable spirits and essential oils it is important that the mash or plant material is evenly heated to effectively distill the desired flavors and scents, where uneven heating may lead to scorching of the material and unpalatable and un-useable product. The present invention provides effective and thorough heating of the contents within the distillation equipment and prevents or reduces scorching of mash or other material.

SUMMARY OF THE INVENTION

The present invention relates to a method and apparatus to more rapidly heat the contents within a distillation apparatus which may assist in purifying greater amounts of water in a shorter period of time and may more effectively distill mash, plant material or other contents to produce potable spirits and essential oils. The present invention includes an innovative heat distribution device referred to herein as the flame flow that is incorporated within the distillation apparatus. In embodiments of the present invention, the flame flow is in direct contact with the heating element to rapidly dissipate heat to the contents within the distillation apparatus. By using the flame flow heat distribution device, the time to heat the contents within the distillation apparatus to an evaporation point is greatly reduced. For example, in purifying water, particularly at a time of scarcity such as from the contamination of an area's water supply, the flame flow may bring water to the evaporation point for collection of the condensed water vapor in about one-half of the time needed in conventional distillation equipment of the prior art. The flame flow provides effective heat transfer to rapidly heat and then condense water to increase the amount of water that can be purified within a set period of time.

The unique method of transferring heat directly using the flame flow provides for more accurate distribution of heat to more quickly reach evaporation temperatures and more evenly control and maintain temperature throughout the contents within the distillation apparatus. The flame flow is unlike distillation equipment of the prior art because using the flame flow the amount of time to reach evaporation temperatures is reduced by almost half. For example, for a mash used to make potable spirits, it is estimated that it can take about 1 hour per 3.78 Liter (1 gallon) to reach evaporation temperatures to initially burn off methanol and other toxins. This time is multiplied based on the size of the copper pot and amount of the contents. The flame flow distributes heat through the mash to more rapidly reach evaporation temperatures and to more evenly heat the mash, so that more methanol and toxins are burned off in a shorter amount of time. Once these impurities are burned off, and the temperature of the mash rises, the flame flow's distribution of heat through the mash improves the vaporization of ethyl alcohol at temperatures between 78.3° Celsius (173° Fahrenheit) and below 100° Celsius (212° Fahrenheit) to more quickly produce and improve the potency of the alcohol produced over distillation equipment of the prior art. The flame flow also improves the adjustment of temperatures and more quickly resets the temperatures of the contents as necessary to optimize the vaporization process. Even in the production of small quantities, such as in producing essential oils in a smaller distillation apparatus, the flame flow improves the overall quality of the final product by preventing or reducing scorching even when the temperature of heating element is increased. The improvement in speed and quality also reduces the amount of British Thermal Units (BTU) required for heating meaning a lower consumption of fuel is needed thereby resulting in a cost savings.

In some embodiments, the flame flow comprises a second heat distribution device installed within the pot of a distillation apparatus increasing the distribution of heat to the contents of the pot and creating movement of the contents while heating thereby further preventing scorching of the contents even when heat from the heating element is rapidly increased. In some embodiments, only one of the heat distribution devices has an exhaust tube. The exhaust tube assists in heating the heat distribution device more rapidly than a heat distribution device that does not have an exhaust tube. The exhaust tube draws air heated by the heating element through the heat distribution device and out through the exhaust tube and an outlet through the distillation apparatus. The exhaust tube provides for heating a first heat distribution device having the exhaust tube at different temperatures and at different rates than a second heat distribution device that does not have an exhaust tube. The differences in temperature of the two heat distribution devices creates fluid currents that swirl between and around the first and second heat distribution devices and thereby move the contents within the distillation apparatus. By moving the contents, the contents are heated faster and are not scorched or burnt even when increased heat is rapidly applied from a heating element. In further embodiments, the flame flow may have additional heat distribution devices that extend to different heights or that are interconnected at different points creating an intertwined piping system that extends through one or more openings through the base of the pot of a distillation apparatus to distribute heat particularly through distillation equipment of larger volumes and to create fluid currents to move the contents within the pot to further prevent scorching.

The present invention is related to a heat distribution device for a distillation apparatus, comprising a first heat distribution device; a second heat distribution device having an exhaust tube. In embodiments of the heat distribution device, the first heat distribution device is attached to a first opening in a bottom of a distillation apparatus and extends to a second opening in the bottom of the distillation apparatus; and the second heat distribution device is attached to a third opening in the bottom of the distillation apparatus and extends to a fourth opening in the bottom of the distillation apparatus. In embodiments of the heat distribution device, the first and second heat distribution devices are hollow. In embodiments of the heat distribution device, the exhaust tube extends from the second heat distribution device to an outlet in the distillation apparatus. In embodiments of the heat distribution device, the exhaust tube is hollow. In embodiments of the heat distribution device, heating the distillation apparatus heats the first heat distribution device at a different rate and to a different temperature than the second heat distribution device having an exhaust tube thereby creating fluid currents that move the contents preventing scorching of the contents in a distillation apparatus. In embodiments of the heat distribution device, the first and second heat distribution devices transfer heat through contents of a distillation apparatus for faster heating of the contents than heating the contents in the distillation apparatus without the first and second heat distribution devices. In embodiments of the heat distribution device, the heat distribution devices seal the contents from the openings in the bottom of the distillation apparatus.

The present invention is also related to a method of distributing heat in a distillation apparatus, comprising attaching a first end of a first heat distribution device to a first opening in a bottom of a distillation apparatus; attaching a second end of the first heat distribution device to a second opening in the bottom of the distillation apparatus; attaching a first end of a second heat distribution device to a third opening in the bottom of the distillation apparatus; attaching a second end of the second heat distribution device to a fourth opening in the bottom of the distillation apparatus; extending an exhaust tube from the second heat distribution device to an outlet in the distillation apparatus. Embodiments of the method of distributing heat in a distillation apparatus comprise heating the bottom of a distillation apparatus on a heating element causing the first heat distribution device to heat at a different rate and to a different temperature than the second heat distribution device having the exhaust tube thereby creating fluid currents. Embodiments of the method of distributing heat in a distillation apparatus comprise moving the contents of the distillation apparatus by the fluid currents created thereby preventing scorching of the contents. Embodiments of the method of distributing heat in a distillation apparatus comprise transmitting heat from the surface area of the first and second heat distribution devices to contents within a distillation apparatus thereby heating the contents more rapidly than in the distillation apparatus without the first and second heat distribution devices.

The present invention is further related to a heat distribution device for a distillation apparatus, comprising at least one hollow heat distribution device extending through the bottom of a distillation apparatus, the heat distribution device configured to transfer heat to contents of the distillation apparatus. In embodiments of the heat distribution device for a distillation apparatus, the at least one heat distribution device is hollow. In embodiments of the heat distribution device for a distillation apparatus, the at least one heat distribution device has an exhaust tube configured to draw exhaust from a heating element through the at least one heat distribution device. In embodiments of the heat distribution device for a distillation apparatus, the at least one heat distribution device extends from a first opening through a bottom of the distillation apparatus to a second opening through the bottom of the distillation apparatus. In further embodiments of the heat distribution device, a plurality of heat distribution devices extend from and to openings in a distillation apparatus. In further embodiments of the heat distribution device for a distillation apparatus, the heat distribution device is shaped as a coil configured for attachment to a propane burner.

These and other features, advantages and improvements according to this invention will be better understood by reference to the following detailed description and accompanying drawings.

BRIEF DESCRIPTION OF THE DRAWINGS

The invention, together with further objects, features, aspects and advantages thereof will be more fully understood and appreciated by consideration of the following description in conjunction with the accompanying drawings in which the respective elements bear the same reference numerals throughout the various views.

FIG. 4A is a bottom view of an embodiment of the flame flow heat distribution device of the present invention extending through the base of the copper pot of the distillation apparatus;

FIG. 4B is a side perspective view of an embodiment of the flame flow heat distribution device of the present invention extending through the base of the copper pot of the distillation apparatus;

FIG. 4C is a top view of an embodiment of the flame flow heat distribution device extending through the base of the copper pot of the distillation apparatus;

FIG. 13A is a bottom view of a further embodiment of the flame flow heat distribution device of the present invention having two heat distribution devices extending through the base of a distillation apparatus of the copper pot type;

FIG. 13B is a side perspective view of an embodiment of the flame flow heat distribution device of the present invention having two heat distribution devices extending through the base of a distillation apparatus of the copper pot type; and FIG. 13C is a top view of an embodiment of the flame flow heat distribution device of the present invention having two heat distribution devices extending through the base of distillation apparatus of the copper pot type.

DETAILED DESCRIPTION OF THE INVENTION

The following description is provided to enable those skilled in the art to make and use the described embodiments set forth in the best modes contemplated for carrying out the present invention. Various modifications, however, will remain readily apparent to those skilled in the art. Any and all such modifications, equivalents, and alternatives are intended to fall within the spirit and scope of the present invention.

Figure 1:
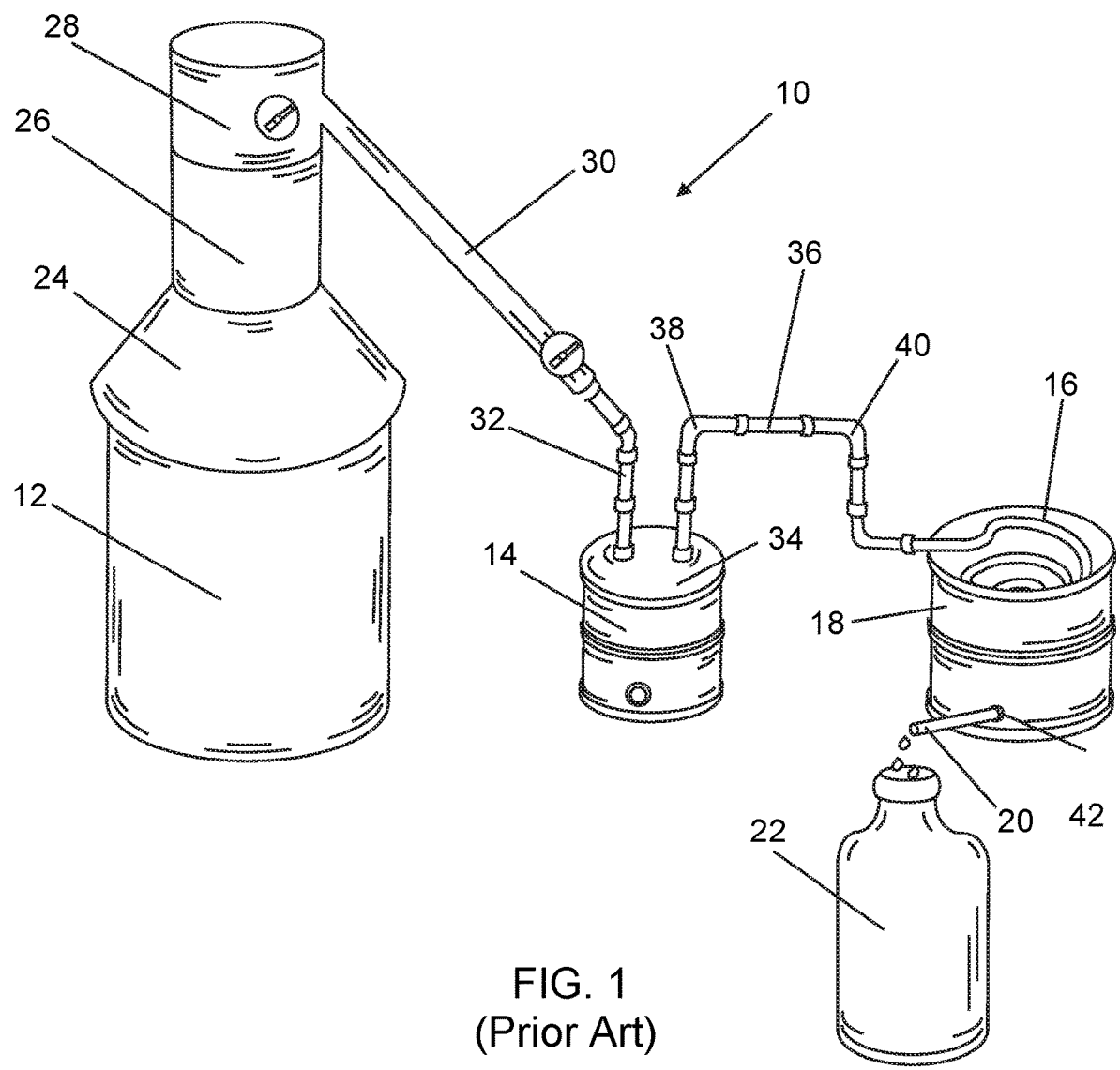
FIG. 1 is a diagrammatic representation of an embodiment of a distillation apparatus of a copper pot type with a thumper and coil collector.

A distillation apparatus 10 for the purification of water and the distillation of potable spirits or essential oils of the copper pot type is shown in FIG. 1. In this embodiment, the distillation apparatus 10 includes a copper pot 12, a thumper 14 and a condenser coil 16 within a chilled container 18 that has an outlet pipe or spigot 20 that directs the distilled liquid to a collection vessel 22. The copper pot 12 is commonly cylindrical in shape and has a volume of between 1 and 100 gallons. The cover 24 of the copper pot 12 may be conical in shape to provide increased surface area to heat and direct the vapor through to an outlet cylinder 26. The copper pot 12 has a removable cap 28 that is fitted with an outlet condenser pipe 30 that is attached to an inlet pipe 32 of the thumper 14. The inlet pipe 32 extends through the thumper cover 34 and the opening of the inlet pipe 32 is submerged in a liquid which may be water, a low proof alcohol or another liquid that partially fills the thumper 14. The thumper 14 acts as a secondary boiler that as the vapor from the copper pot 12 condenses and drips hot liquid down from the condenser pipe 30 to the inlet pipe 32, the liquid in the thumper is heated causing further evaporation. The vapor from the thumper 14 escapes through the outlet pipe 36 that is attached at the cover 34 of the thumper 14. The outlet pipe 36 extends upwards and may in preferred embodiments have an initial angular bend 38 and then extend for a distance of between 6" to 24" to increase the distance and surface area within the outlet pipe 36 and provide for the vapor to condense. A second angular bend 40 directs the vapor and condensation through the condenser coil 16 that also may be of an extended length to increase condensation. The condenser coil 16 may be placed in a container filled with ice water to rapidly cool the vapor within the condenser coil 16 and further increase condensation. An outlet 42 is provided near the bottom of the container 18. The condenser coil 16 may extend through the outlet 42 or preferably a spigot 20 is fitted to the condenser coil 16 to direct the condensed liquid from the distillation apparatus 10 to the collection vessel 22.

Figure 2:
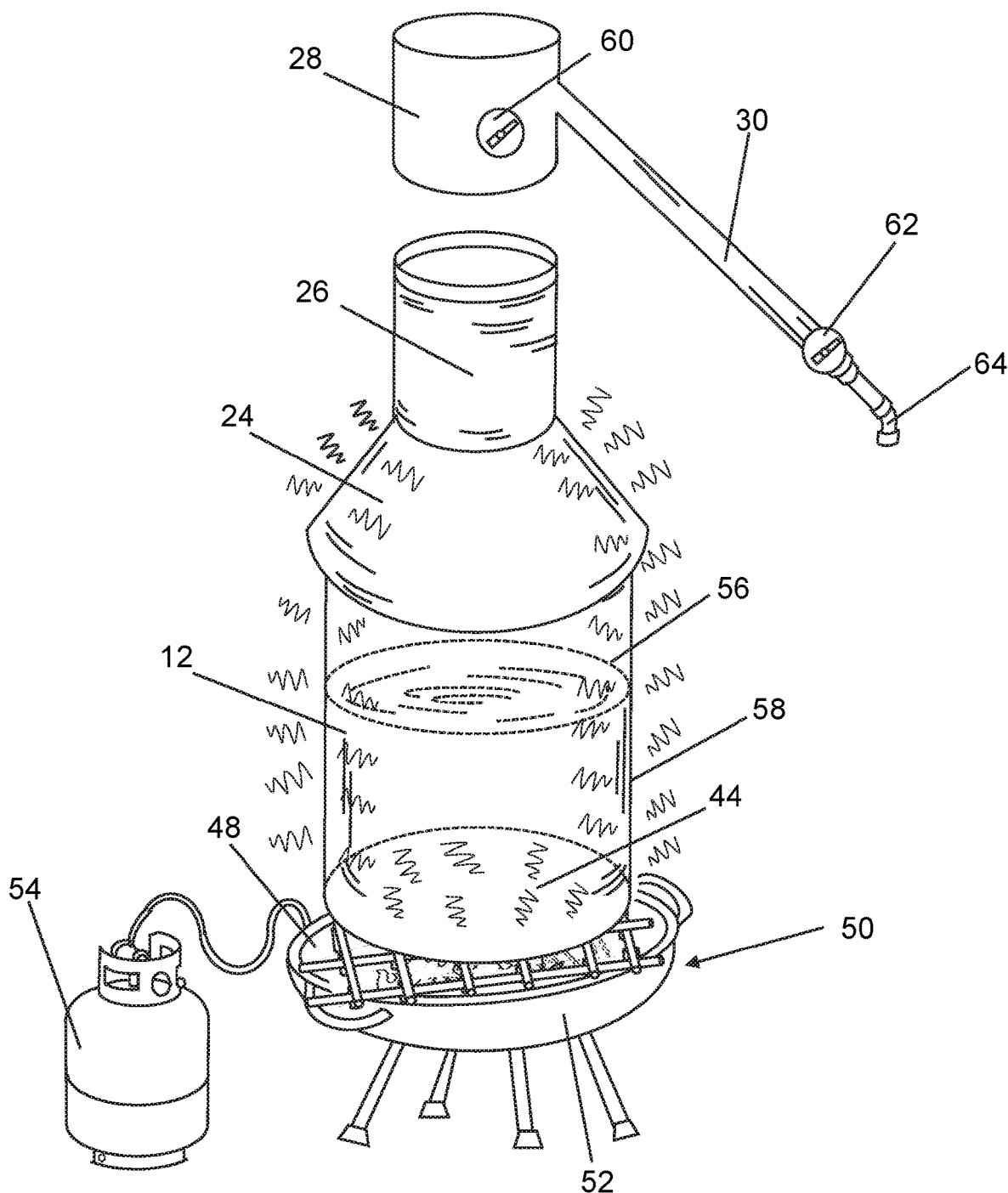
FIG. 2 is a diagrammatic representation of an embodiment of a distillation apparatus of a copper pot type of the prior art with a propane grill type heating element.

A copper pot 12 of the prior art has a flat bottom 44, as is shown in FIG. 2. The flat bottom 44 of the copper pot 12 is placed on a rack 46 or other support. The rack 46 is placed over a heating element 50 such as a grill 52 with propane tank 54. A variety of heating elements may be used to heat the pot of the distillation apparatus 10 including a campfire, a propane burner, an electric or gas stove top, an electric hot plate or other type of heating source. The copper pot 12 is filled by removing the cap 28 and pouring in water for purification, pouring in a fermented mash from a suitable type of grain, adding plant material on a grid, or filling the copper pot with another type of material requiring distillation. The contents fill the copper pot 12 to about three quarters full to leave some room at the top for evaporation while heating. The copper pot 12 is then heated by applying heat to the flat bottom 44 of the copper pot 12 that because of the highly conductive properties of copper transmits heat along the surface area of the bottom 44 and along the tubular sidewall 58 of the copper pot 12. By heating only, the bottom 44 of the copper pot 12 it may take a number of hours to heat the contents to an evaporation point depending on the size of the copper pot and vaporization temperature of the contents.

For example, to produce a potable spirit, a mash 56 must be heated to an initial evaporation plateau of 64.4° Celsius (148° Fahrenheit) to vaporize methanol and other impurities that are toxic. By only heating the bottom and edges of the mash 56 as shown in the copper pot of the prior art in FIG. 2, it is estimated that it can take about 1 hour per 3.78 Liter (1 gallon) to reach the initial plateau the time of which is multiplied based upon how much mash 56 is within the copper pot 12. For a smaller six-gallon distillation apparatus 10, it may be between 4 and 6 hours with steady heat applied to reach temperatures above 64.4° C. (148° F.). This time is dramatically increased for a larger distillation apparatus that may be as large as 100 gallons. Importantly, the mash 56 must be heated evenly to the proper temperatures to get the highest amount of vaporization, but simply applying more heat to the heating element 50 to speed up the process is not an acceptable approach because the bottom and edges of the mash 56 begin to scorch which ruins the flavors from the mash 56 and results in poor taste and quality of the potable spirits being distilled.

A shown in FIG. 2, a thermometer 60 is provided to measure the temperature at the cap 28 and a second thermometer 62 may be provided at the end near the outlet fitting 64 of the condenser pipe 30 to determine when the initial evaporation plateau is reached to burn off the toxic impurities and when ethyl alcohol begins to vaporize which is at around 78.8° C. (174° F.). The condensed liquid during this first run or foreshot of alcohol contains the toxic impurities including methanol and acetone and has a slippery feel as it drips from the spigot 20. The fore shot is collected until the temperature at the cap 28 of the copper pot increases from the initial evaporation plateau to the ethyl alcohol evaporation point of 78.8° C. (174° F.) as the methanol and other toxic impurities are burned off. All of the condensation collected during this period is discarded and a clean collection vessel 22 is placed at the spigot 20. The distilled alcohol is then collected as the temperature is maintained and rises slowly to around 87.2° C. (189° F.) as most of the ethyl alcohol is evaporated from the mash 56. When the temperature rises above this temperature, the collected alcohol may at this point have a flowery smell and the temperature may more rapidly increase towards 100° C. (212° F.) the boiling temperature as more water vapor from the mash 56 begins to evaporate. The collection vessel 22 of alcohol may be removed from the spigot 20 and another vessel 22 may be used to collect the condensed liquid or tail end as it is referred to in the art. The tail end may be poured back into the copper pot 12 to be distilled through a subsequent heating process. During this lengthy process of distillation of alcohol from mash 56 there are issues in reaching proper temperatures and maintaining those temperatures where if too little heat is applied the purity of ethyl alcohol collected may be low or if too much heat is applied the mash 56 may scorch. Also if inconsistent heat is applied then the length of time to thoroughly heat the mash to reach the proper temperatures is significantly increased, all of which may lead to frustration at the amount of time required with the result being a poor quality alcoholic product that is not palatable to consume.

Figure 3:
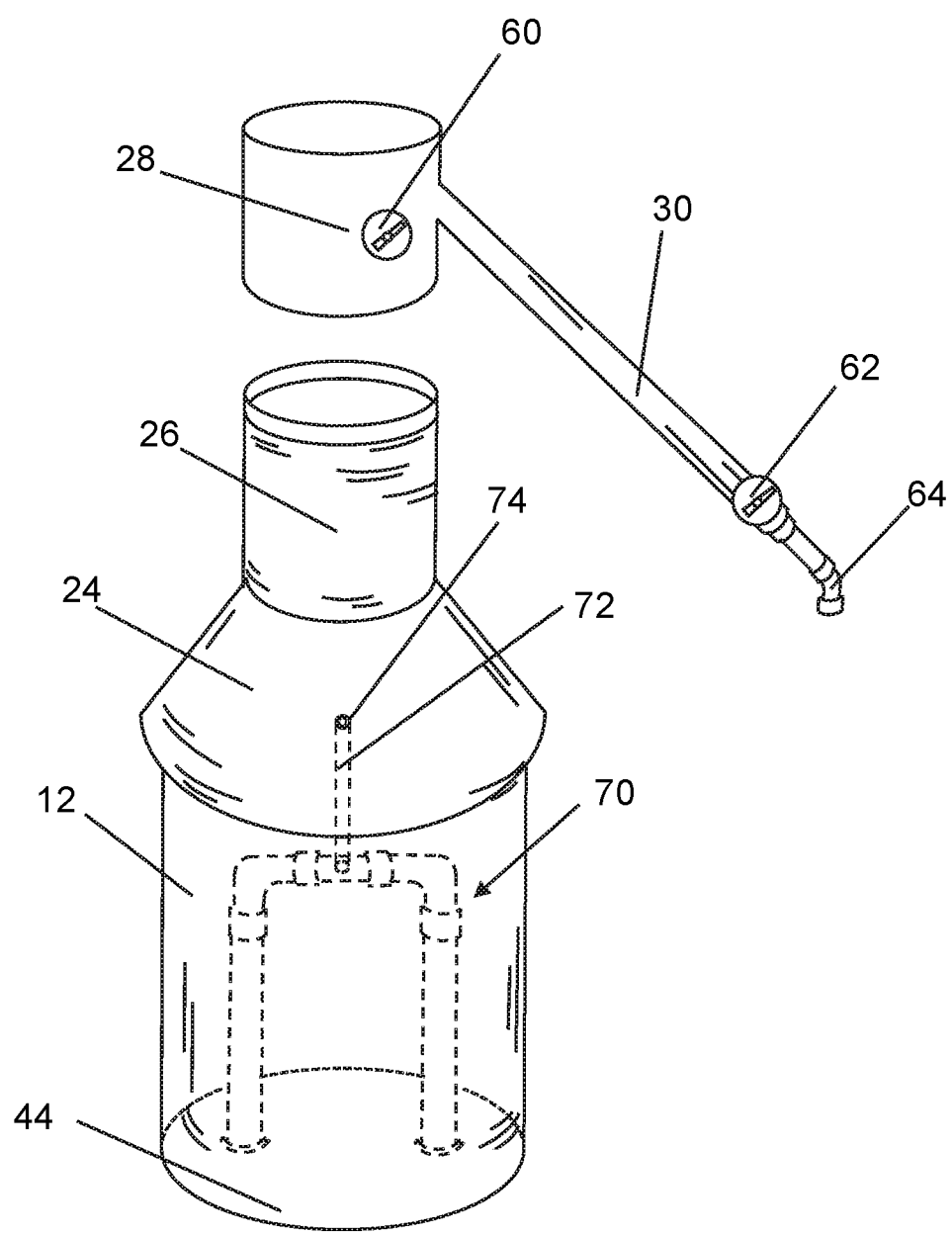
FIG. 3 is a diagrammatic representation of an embodiment of the flame flow heat distribution device of the present invention used with a distillation apparatus of a copper pot type.

The present invention provides a unique heat distribution device referred to as the flame flow that more rapidly heats and maintains the contents of a distillation apparatus at appropriate temperatures and that prevents or reduces scorching of the contents even when applying increased amounts of heat to the heating element 50. The more rapid heating also reduces the amount of BTUs required for heating there by saving the cost and amount of fuel used. As shown in FIG. 3, the flame flow 70 is a heat distribution system configured from metallic rods that extend through the bottom 44 of the copper pot 12 providing for the distribution of heat throughout the interior of the copper pot 12. When placed on a heating element 50, the flame flow heat distribution device 70 is in contact with the heating element and is heated along its surface area that extends into the copper pot 12. In some embodiments, the flame flow heat distribution devices 70 is constructed from hollow pipes that surround an opening in the bottom 44 of the copper pot 12 and thereby also draw heated air through the pipes to heat the flame flow 70 and distribute heat to the contents of the copper pot 12. In some embodiments, the flame flow heat distribution device 70 has an exhaust tube 72 that is inserted into and connected to an opening in a hollow pipe of the flame flow 70 and is connected to an opening or outlet port 74 that goes through the cover 24, sidewall 58, or another surface of the copper pot 12. The exhaust tube 72 draws heated air or flame from a heating element through the hollow pipes of the flame flow 70 thereby heating the surfaces of the flame flow 70.

As shown in FIG. 4A, in an embodiment the flame flow heat distribution device 70 is constructed by cutting out one or more openings in the circular piece of copper that will form the bottom 44 of the copper pot 12. In an embodiment, the openings 76 and 78 are positioned at a distance F1 from a first diameter D1 to the centerline C1 of each opening with the center of each opening 76 and 78 positioned along a second diameter D2 of the bottom 44 of the copper pot 12. In a configuration having two openings as shown in FIG. 4B, the flame flow heat distribution device 70 may be constructed by extending and attaching a pipe 80 from the first opening 76 in the bottom 44 of the copper pot 12 and attaching the pipe 80 to an elbow connector 82 that is attached to a connector pipe 84 that extends an adequate length to connect with a second elbow connector 86 and a second pipe 88 that extends from the second opening 78 in the bottom 44 of the copper pot 12. Joint fittings 90 are brazed at each connection to seal the flame flow heat distribution device 70 and prevent leaking from the interior of the copper pot 12. As shown in a top view in FIG. 4C, an embodiment of an exhaust tube 72 is attached and sealed to the connector pipe 84 along a side surface of the pipe 84 in order to extend at an angle from the pipe 84 and mate with the cone shaped surface of the cover 24. The outlet 74 for the exhaust tube 72 is formed in the cover 24 and the exhaust tube 72 is brazed and sealed to the cover 24.

Figure 5:
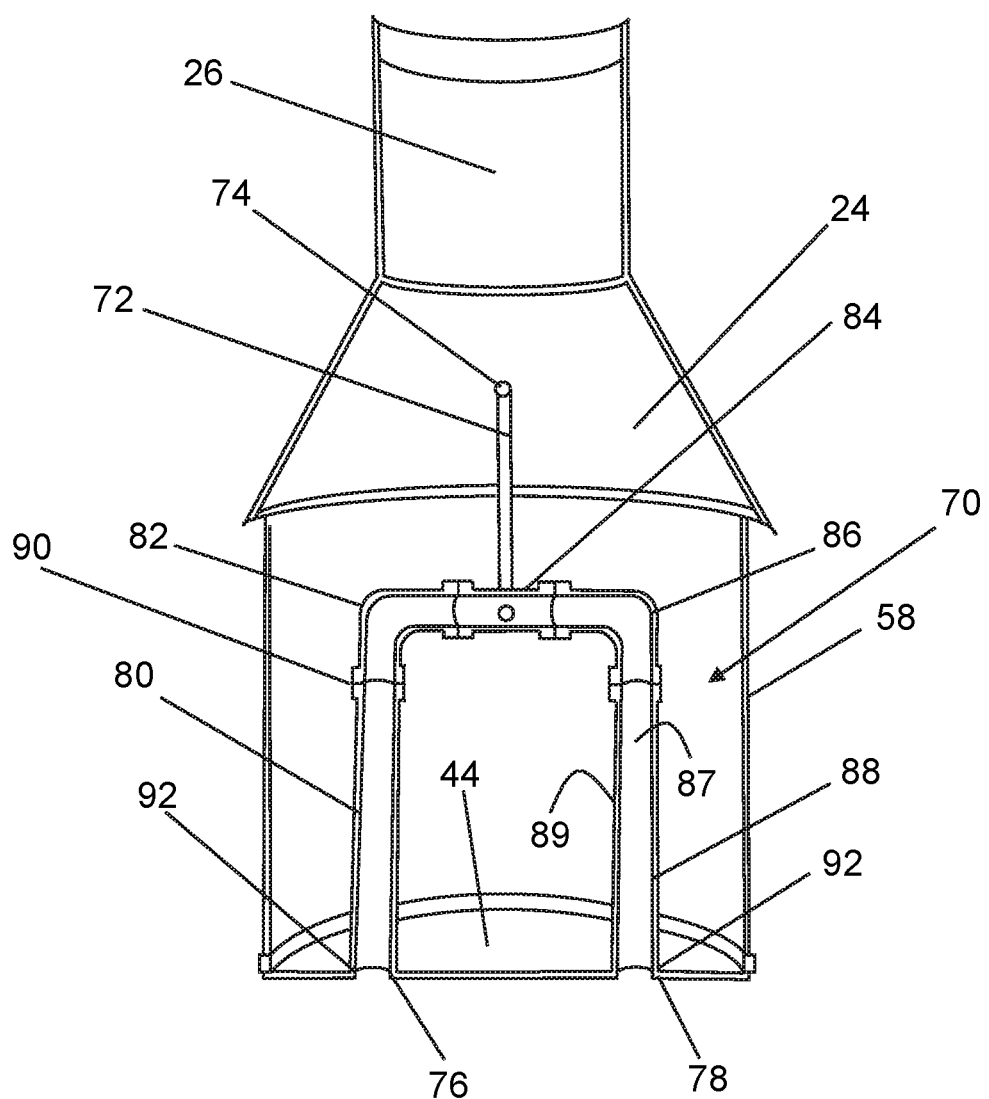
FIG. 5 is a cross-sectional view of an embodiment of the flame flow heat distribution device of the present invention extending through the base of the copper pot of the distillation apparatus with the exhaust of the flame flow heat distribution device extending through the cover of the distillation apparatus.

As shown in a cross-sectional view in FIG. 5 the connection at the end 92 of each of the pipes 80 and 88 extends the hollow interior of the pipes 80 and 88 through the openings 76 and 78 respectfully. The ends 92 of the pipes 80 and 88 are in direct contact with a heating element 50 creating conduction heating along the surfaces of the flame flow heat distribution device 70. Air heated by the heating element 50 is directed up and through the hollow interior surfaces 87 of the pipes 80 and 88, up and through the first and second elbow connectors 82 and 86 and through the connector pipe 84 providing constant heat through the flame flow heat distribution device 70 as heated air is drawn out through the exhaust tube 72 and outlet 74. This convection heating within the flame flow 70 and the conductive heating from surface to surface contact of the bottom 44 of the copper pot 12 to the pipes 80 and 88 and the bottom 44 of the copper pot 12 to the heating element 50 provides for both the interior 87 and exterior surfaces 89 of the pipes 80 and 88 to be directly heated and to hold and maintain stable temperatures. By connecting the pipes 80 and 88 within the interior of the copper pot 12, heat from a heating element 50 is conducted along the copper surfaces of the piping of the flame flow 70 to distribute heat with the extended exterior surfaces 89 of the flame flow 70 conducting heat through the contents within the copper pot 12. The contents are also heated along the outer edges that are in contact with the tubular sidewall 58 and heating of the bottom of the contents that are in contact with and heated by the bottom 44 of the copper pot 12.

Figure 6:
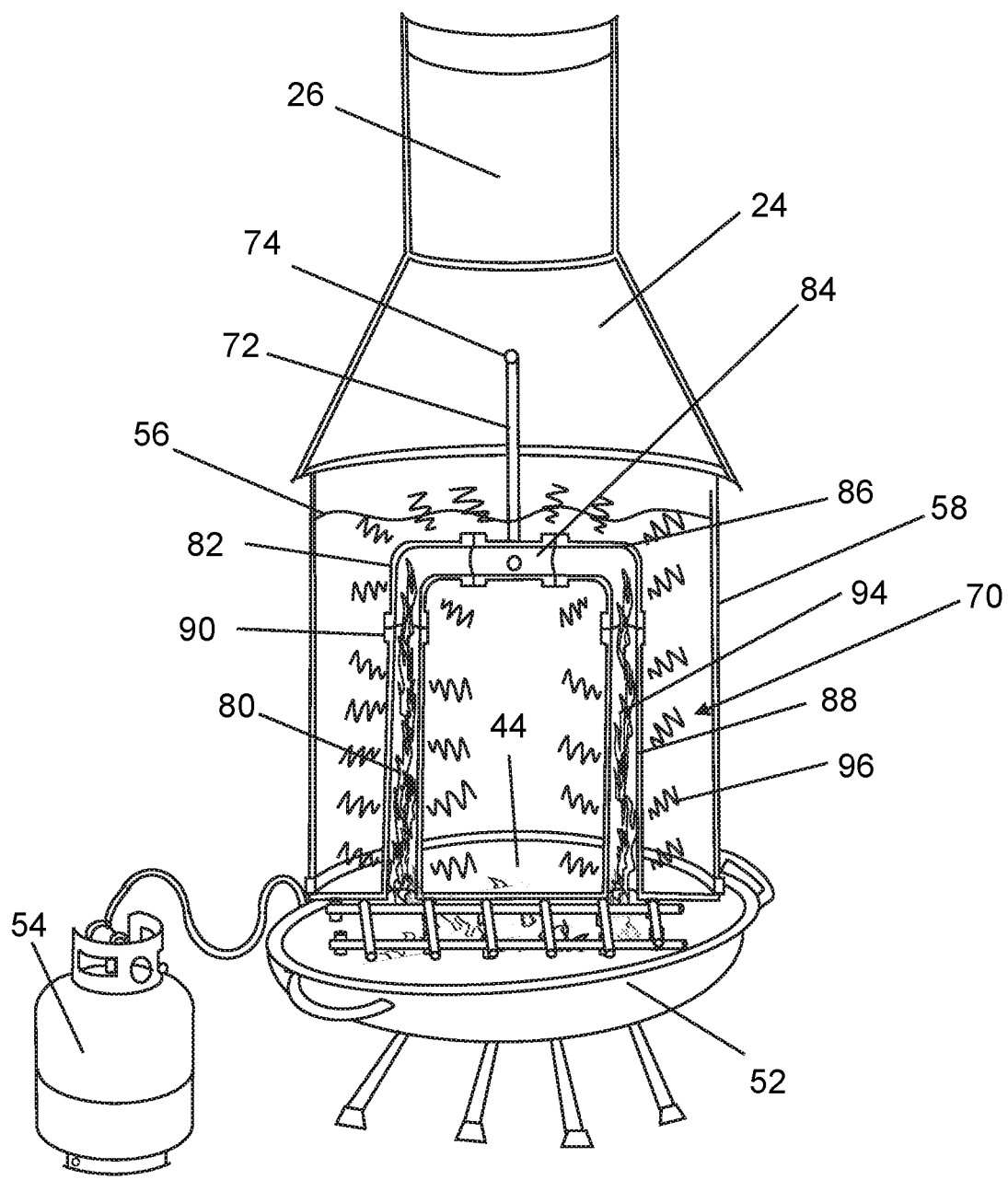
FIG. 6 is a cross-sectional view of an embodiment of the flame flow heat distribution device of the present invention extending through the base of the distillation apparatus and with the exhaust of the flame flow heat distribution device extending through the cover of the distillation apparatus seated on a heating element.
Figure 7:
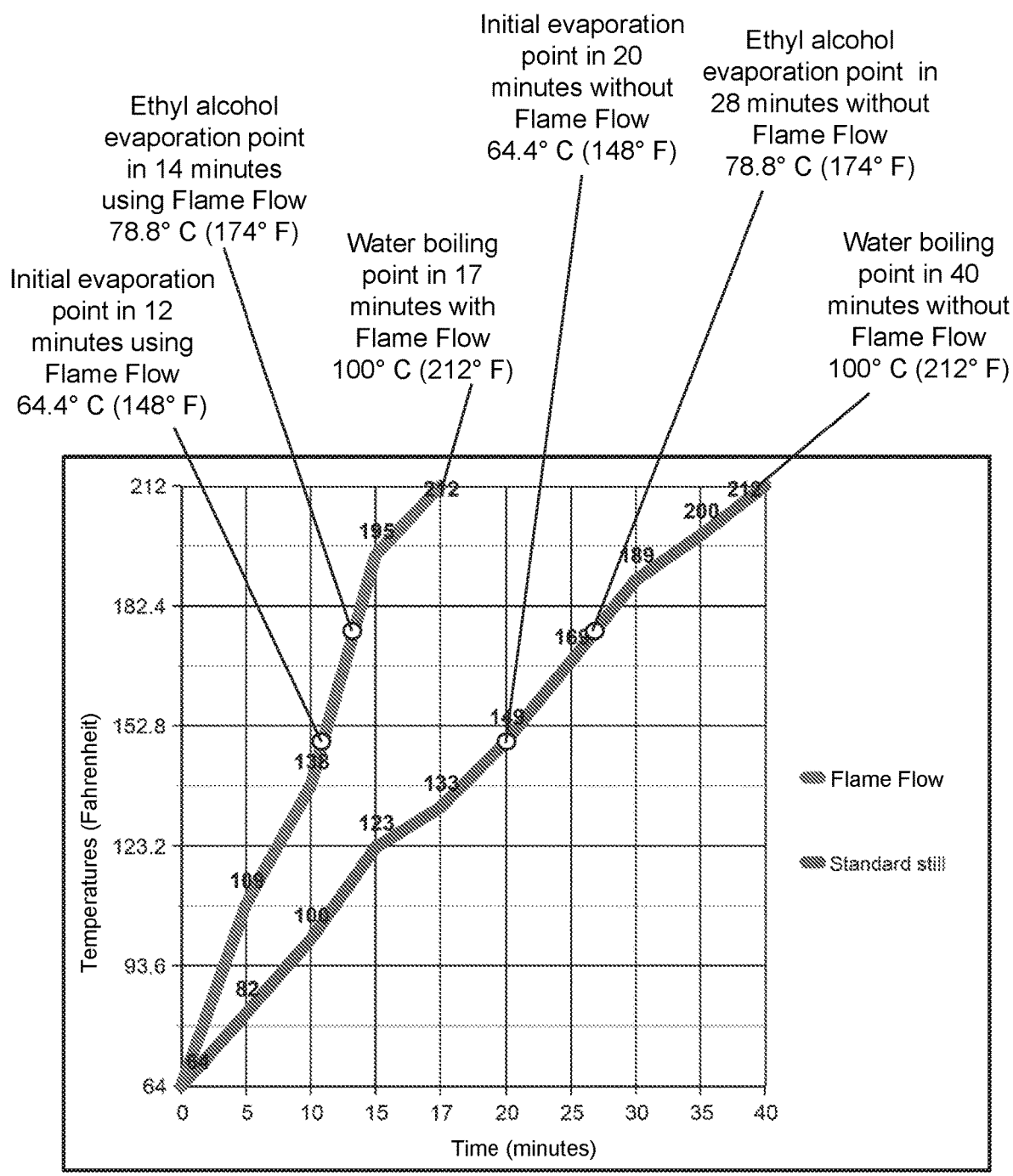
FIG. 7 is a graph showing the reduced amount of time to heat water using an embodiment of the flame flow heat distribution device of the present invention as compared to heating water within distillation equipment of the prior art.

For example, when the copper pot 12 filled with water 57 is placed on an open flame from a grill 52 as shown in cross-section in a diagrammatic representation in FIG. 6, the exhaust tube 72 draws the flames 94 up through the pipes 80 and 88 thereby heating the pipes 80 and 88 along the interior 87 and exterior surfaces 89 to distribute heat 96 out and to the water 57 that surrounds the pipes 80 and 88. Smoke from the flame 94 is drawn up and expelled through the outlet 74 in the cover 24 so the flames 94 may extend along the entire length of the pipes 80 and 88. Because the water 57 is directly in contact with the heated surface area of the flame flow 70 within copper pot 12 not just at the bottom and along the edges, the time to reach the initial evaporation plateau is reduced by almost half. For example, in using the flame flow within a distillation apparatus filled with six gallons of water, the water reached the boiling point at the evaporation temperature of 100° C. (212° F.) in only 17 minutes instead of 40 minutes in a standard six-gallon copper pot distillation apparatus of the prior art, as shown in the graph in FIG. 7. The graph also shows that water within the pot reached the initial evaporation plateau of 64.4° C. (148° F.) in only 12 minutes as compared to 20 minutes in a distillation apparatus of the prior art and the ethyl alcohol evaporation point was reached in only 14 minutes as compared to 28 minutes or roughly half of the time to reach this temperature in standard type flat bottom distillation equipment of the prior art. While these results do not show the time to reach these temperatures using a mash to produce alcohol or plant material to produce essential oils, the results may be similar if the distillation solution has a fairly high water content where the direct distribution of heat to the mash or other material using the flame flow, should improve the time required to reach the initial evaporation plateau and the evaporation point for ethyl alcohol. An improvement in heating as shown in these results from the heating of water in a copper pot 12 having a volume of 6 gallons should also be similar in copper pots 12 of larger volumes where different configurations of the flame flow 70 may effectively distribute heat through the contents of the pot. Some configurations of the flame flow 70 may decrease the time to reach evaporation plateau and evaporation temperatures in two to three times faster than the distillation equipment of the prior art and better control heat and maintain temperatures to increase the overall amount of evaporation thereby for example evaporate more alcohol in a shorter period of time. The improved control of temperatures through the direct connection of the flame flow 70 through the bottom 44 of the copper pot 12 and to the heating element also prevents scorching even when heat is rapidly increased producing better tasting and higher quality potables.

The flame flow heat distribution device 70 provides more surface area for the distribution of heat from the heating element 50 along the pipes 80 and 88, elbows, 82 and 86 and connector pipe 84 thereby distributing heat directly to the interior of the contents. By having a larger surface area to dissipate heat, the flame flow 70 also helps to prevent the distillation solution such as a mash 56 from scorching. In copper pots 12 of the prior art only the flat surface of the bottom 44 of the copper pot 12 comes in contact with the heating element 50. Scorching of the contents or mash 56 can therefore occur because when increasing the heat, the heat initially increases at one location where the bottom 44 directly contacts the heating element 50 and the contents at this location heat more rapidly than the contents that are further away from the bottom 44 of the pot 12. From this location the heat is slowly transferred out along the surface of the bottom 44 and to the sidewalls 58 but by having increased heat in one location, the contents in direct contact are scorched before the heat can be transferred. The flame flow 70 is directly in contact with the heating element 50 through the opening in the bottom 44 of the copper pot 12 so that as the heat is increased, the heat transfers up the pipes 80 and 88 and dissipates into the mash 56 or other contents evenly, not at the single location at the bottom 44 where there is direct contact with the heating element 50. Using the flame flow 70, the heat can be increased in temperature without scorching the contents thereby preventing mash 56 or essential oils from being ruined.

Various embodiments and configurations of the flame flow 70 are therefore contemplated based on the size of the copper pot 12, size of the heating element 50 and the heating requirements. Any number of openings may be provided within the bottom 44 of the copper pot 12 and different configurations of pipe where multiple pipes may interconnect or multiple pipe connections between pairs of two or more holes may be placed in various locations along the bottom 44. The piping of the flame flow may further be stacked or layered to heat the contents at different levels as measured from the bottom 44 of the pot 12. In one embodiment for a larger copper pot 12 of 20 to 30 gallons, a ring of openings may be positioned around a center point with piping intersecting at the center point to heat the larger volume of contents for example a mash 56 used in a distillery for the production of potable spirits. Alternatively, piping may extend up from each opening with each pipe having a series of openings. Connecting pipes may be installed to connect two pipe openings at a certain height within the copper pot 12. Other connecting pipes may connect two pipe openings at a higher point and a third connecting pipe may connect a third pair of openings at an even higher point with each higher pipe looping over the lower pipe or pipes. Exhaust tubes 72 may be attach to the interconnection of pipes at various points and extend out through the sidewalls 58 of the copper pot 12 or through the cover 24 to draw flames, heated air, smoke and other gases through the flame flow 70. Any number of configurations may be provided to optimize heating time, maintain the heat evenly throughout the contents and thereby prevent scorching of the contents.

Figure 8:
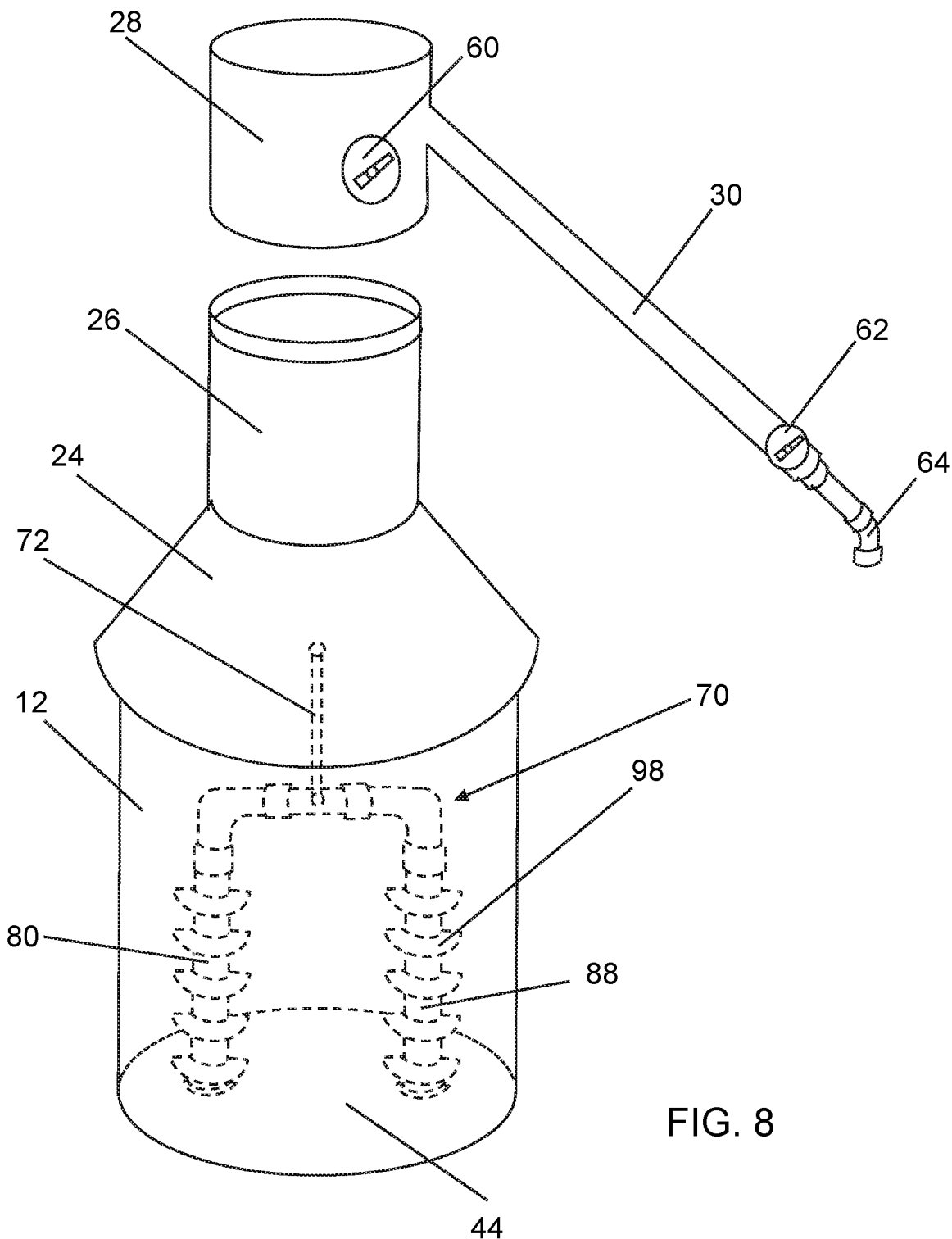
FIG. 8 is a diagrammatic representation of a further embodiment of the flame flow heat distribution device of the present invention within the distillation apparatus.
Figure 9:
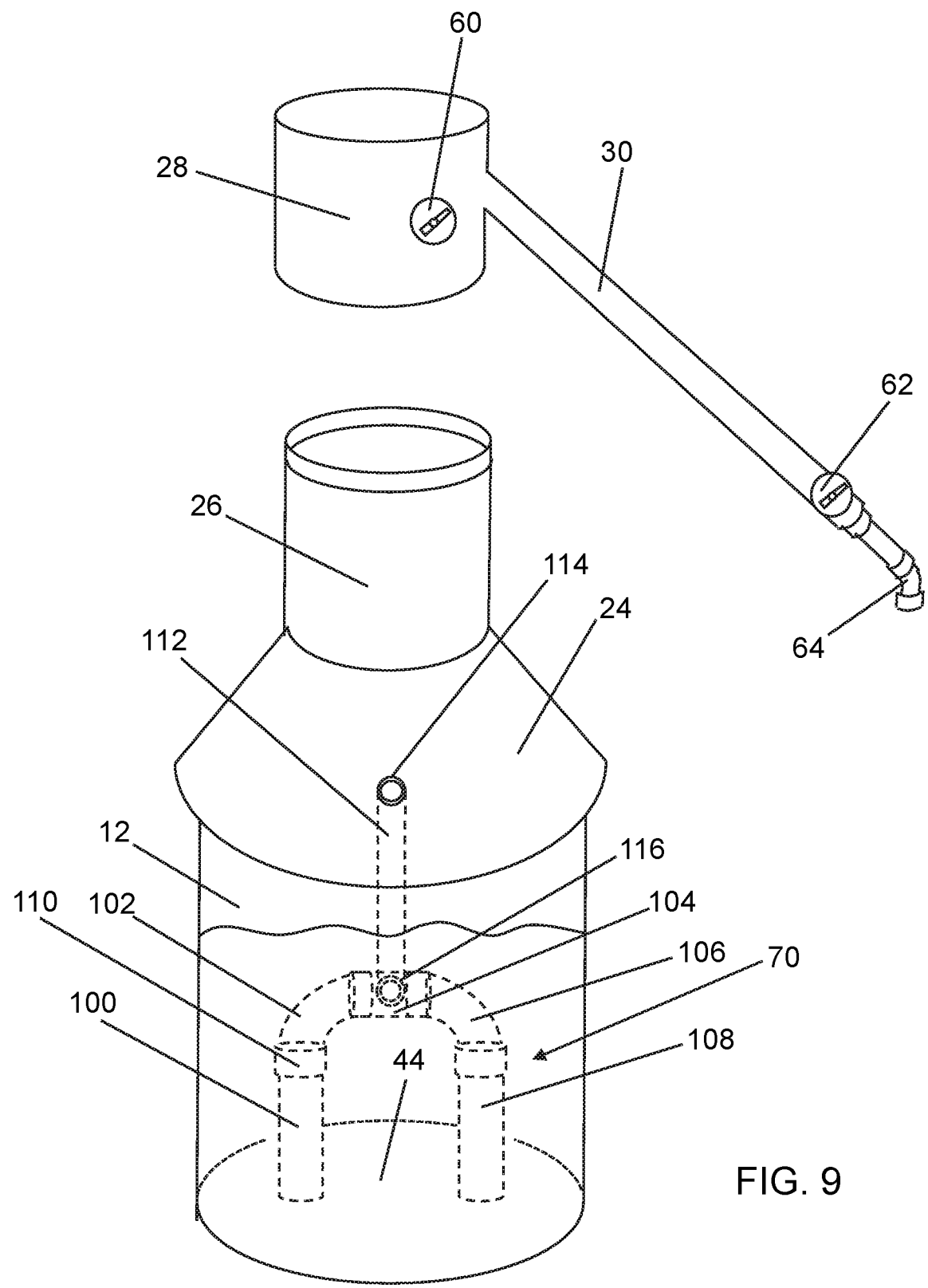
FIG. 9 is a diagrammatic representation of a still further embodiment of the flame flow heat distribution device of the present invention within a distillation apparatus of the copper pot type.

In further embodiments, the flame flow 70 may be fitted with a series wings or flanges 98 of copper that extend out and around the pipes 80 and 88 to further increase the heated surface area and distribute more heat throughout the interior of the mash 56 or other contents, as shown in FIG. 8. In a further embodiment as shown in FIG. 9, the pipes may be shortened and may be of a larger diameter. In this embodiment of the flame flow 70, the first pipe 100 is connected to a semi-circular pipe 102 that is connected to a cross connecting pipe 104, a second circular pipe 106 is connected to the cross connecting pipe 104 and to a second shortened pipe 108 extending from the opening in the bottom 44 of the copper pot 12. The connection points are sealed using joints 110 to prevent leaking. In this embodiment, the exhaust tube 112 may be of a larger diameter with an enlarged outlet 114 through the cover 24 and inlet 116 from the cross connecting pipe 104. The shortened pipes 100 and 108 may be submerged within the mash 56 or other contents leaving added head space in the top of the copper pot 12 to provide for steam to build up and flow out of the cap 28 and through the smaller condenser pipe 30. Other embodiments of the flame flow 70 may have a single pipe that extends through the bottom 44 of the copper pot 12 and out through the cover 24 or have a single curved pipe that extends from a first opening in the bottom 44 to a second opening in the bottom. The single curved pipe may in some embodiments have an exhaust tube 72 to draw heated air, flames, smoke or other gases through the flame flow heat distribution device 70. Many possible configurations of the flame flow 70 are contemplated within the scope of this invention to better control and adjust temperature, more rapidly and evenly transmit these adjustments in heat to the contents, and reduce or prevent burning or scorching of the contents within a copper pot distillation apparatus 10 or other type of distillation apparatus.

Figure 10:
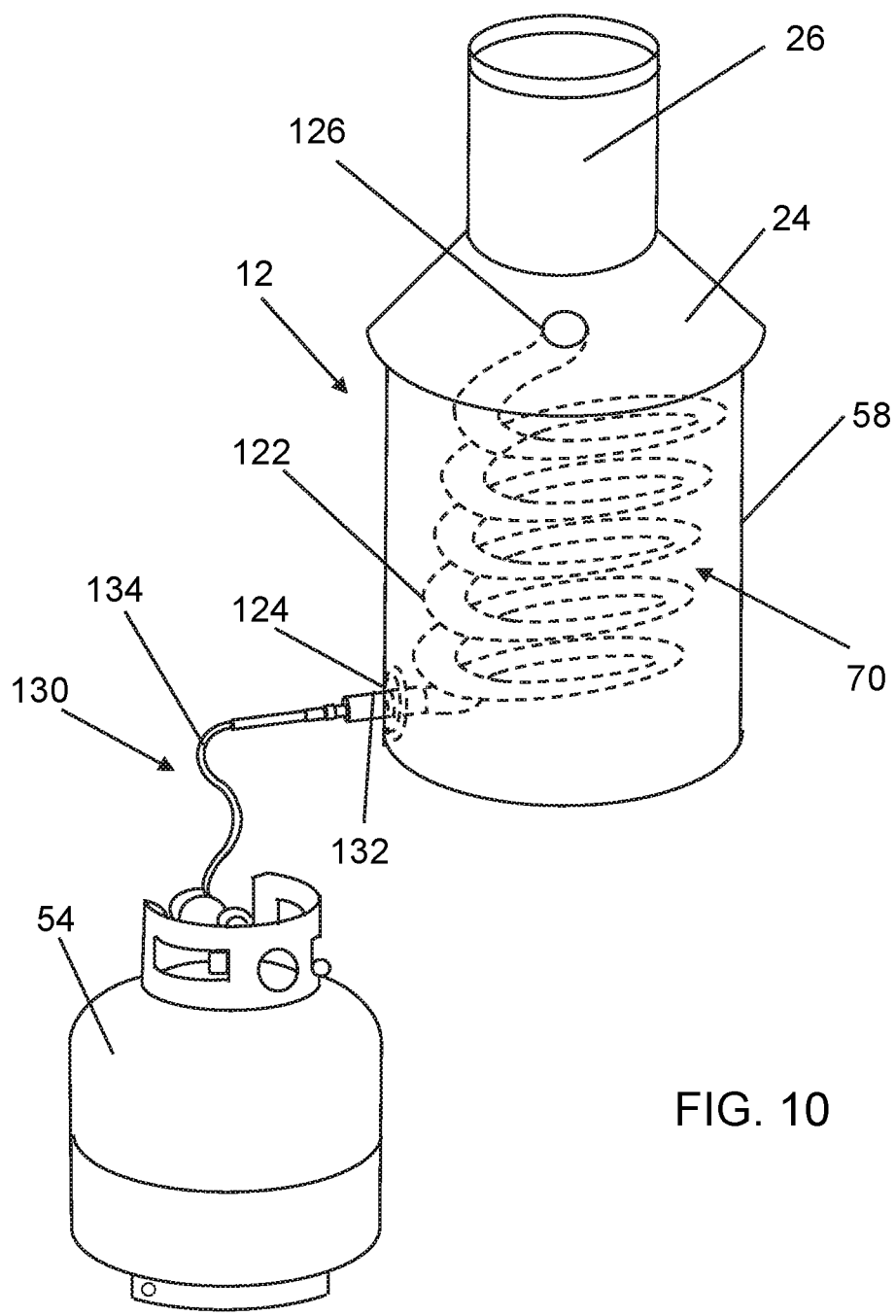
FIG. 10 is a diagrammatic representation of a still further embodiment of the flame flow heat distribution device of the present invention within a distillation apparatus of the copper pot type and attached to a propane burner as the heating element.

In a still further embodiment as shown in FIG. 10, the flame flow heat distribution device 70 may be formed as a coil 122 or extended pipe that extends from a port 124 at the base of the pot 12 to an exhaust outlet 126 that may be through the cover 24 or along another upper portion of the sidewall 58. The flame flow heat distribution device 70 may be of any shape and dimension adequate to wind through the pot 12 to transfer heat from a heating element 50 to rapidly and evenly distribute heat through the contents of the pot 12. In a preferred embodiment, the port 124 may provide for the attachment of a propane burner 130 to the pot 12 to be used as the heating element. The port 124 is formed as a recess having a diameter slightly larger than the torch fixture 132 on the end of a connecting hose 134 of the propane burner 130. In some embodiments, the depth of the recess port 124 would be of a length of 10.16 cm (4 inches) to 15.24 cm (6 inches) to provide for the torch fixture 132 to be inserted and held within the recess port 124. The hose 134 is attached to a propane tank 54 and flames from the propane burner 130 are directed from the torch 132 through the flame flow heat distribution device 70 with the coil 122 of the flame flow heat distribution device 70 distributing heat through the contents of the pot 12.

Figure 11:
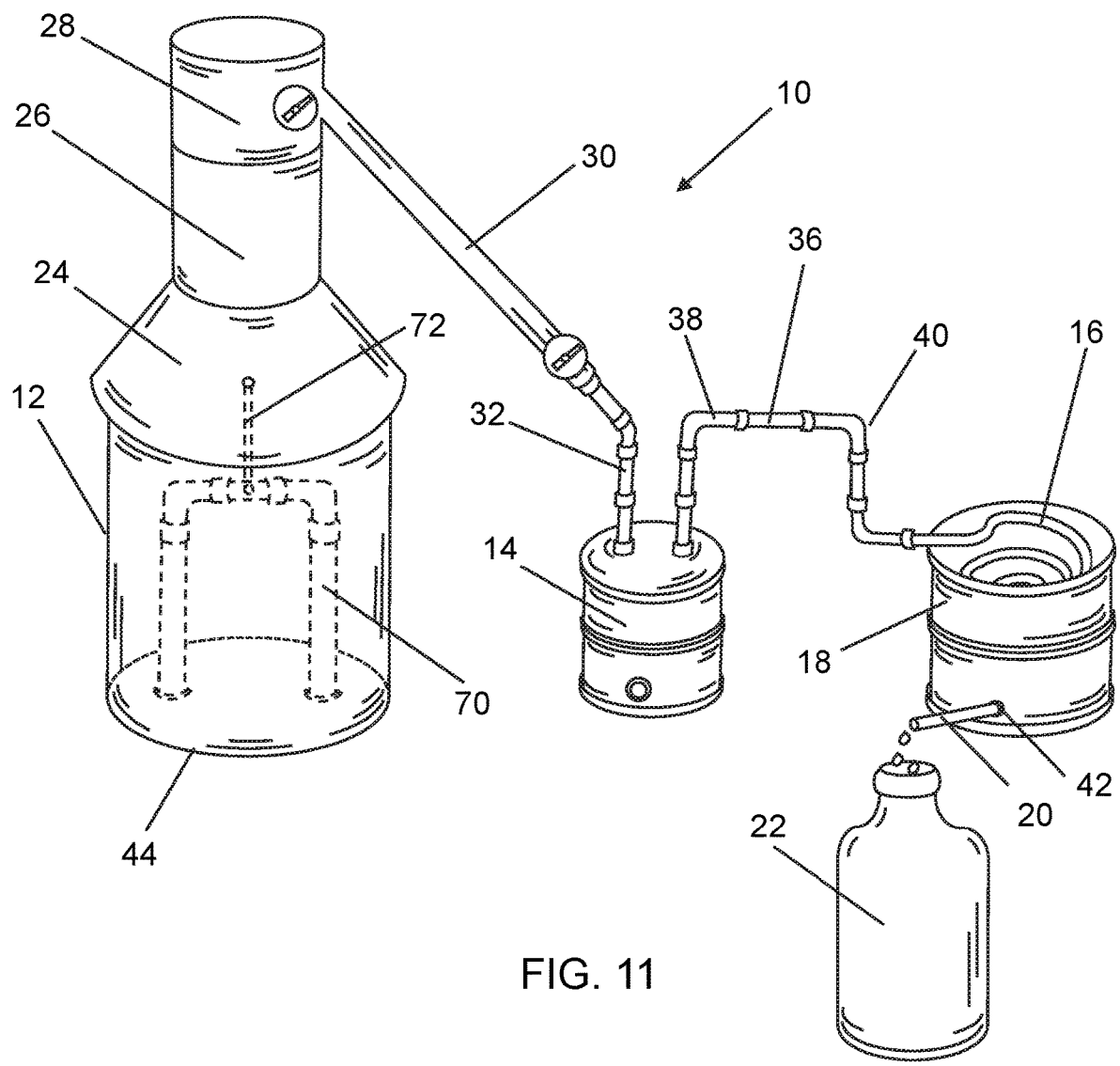
FIG. 11 is a diagrammatic representation of an embodiment of the flame flow heat distribution device within a distillation apparatus of the copper pot type with a thumper and coil collector.
Figure 12:
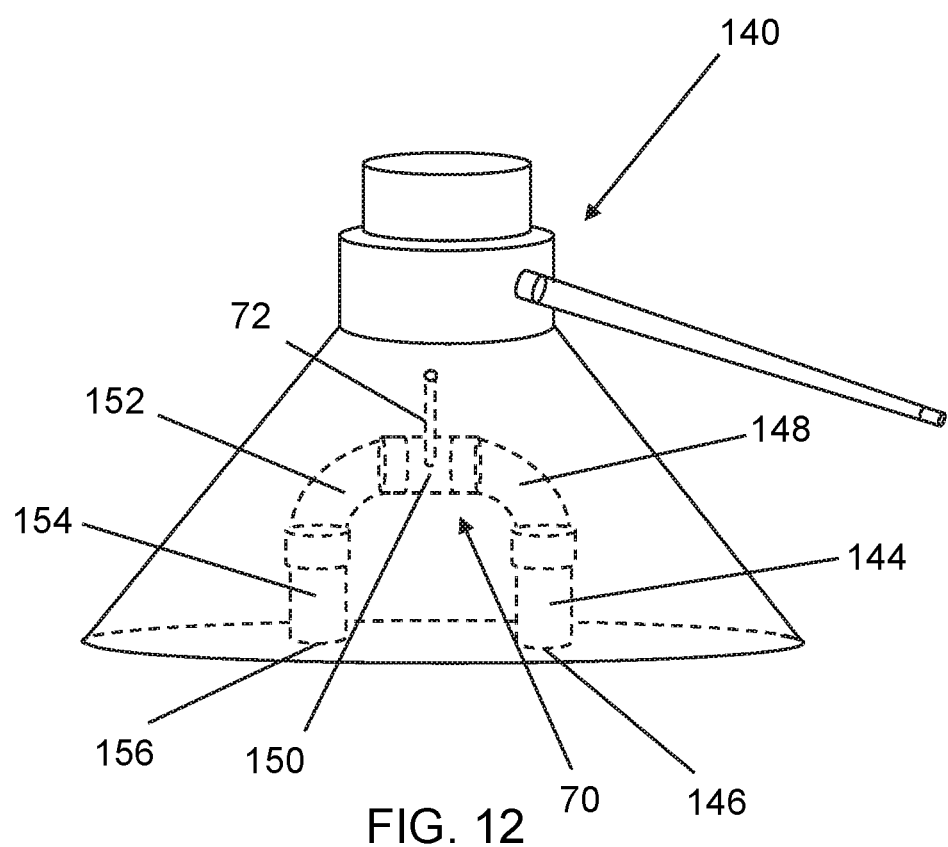
FIG. 12 is a diagrammatic representation of a still further embodiment of the flame flow heat distribution device within a distillation apparatus referred to herein as an Amerilembic type which is similar to an alembic type distillation apparatus.

As shown in FIG. 11, the flame flow heat distribution device 70 in various configurations may be used within the copper pot 12 in a similar manner within the distillation equipment 10 as shown in FIG. 1 and as described above. The flame flow heat distribution device 70 may also be used in any other type of distillation equipment such as is known in the prior art such as distillation apparatus 140 of an alembic style, or one as shown in FIG. 12, which is of a type referred to herein as an Amerilembic. This smaller type of distillation apparatus 140 may be used for the distillation of essential oils. The flame flow heat distribution device 70 may be constructed as a semi-circular loop by attaching a pipe 144 to a first opening 146 in the bottom 148 of the Amerilembic distillation apparatus 140. Attaching a curved connector 148 to the pipe 144 and to an extension pipe 150 that is of an adequate length to connect to a second curved connector 152 that connects to a second pipe 154 that is attached to a second opening 156 in the bottom 148 of the distillation apparatus 140. The flame flow heat distribution apparatus 70 may in some embodiments have an exhaust tube 72 attached to draw heated air, flames, smoke or other gases through the flame flow heat distribution device 70. Various configurations of the flame flow 70 will improve heating time and the overall uniformity in heating and will reduce or prevent scorching of the plant material, an important consideration in developing perfumes and bath oils.

In a further embodiment, as shown in FIG. 13A, the flame flow heat distribution device 70 is constructed by cutting out four openings 160, 162, 164, and 166 in the circular piece of copper that will form the bottom 44 of the copper pot 12. In this embodiment, the openings 160, 162, 164, and 166 are positioned at a distance F1 from a first diameter D1 to the centerline of each of the openings 160, 162, 164, and 166 and at a distance F2 from a second diameter D2 to the centerline of each of the openings 160, 162, 164, and 166. In a configuration having four openings as shown in FIG. 13B, the flame flow heat distribution device 70 may be constructed by extending a first pipe 168 from the first opening 160 in the bottom 44 of the copper pot 12. The pipe 168 is attached to an elbow connector 170. The elbow connector 170 is attached to a connector pipe 172 that extends an adequate length to connect with a second elbow connector 174. The second elbow connector 174 is connected to a second pipe 176 that extends from and is attached to the second opening 162 in the bottom 44 of the copper pot 12 to form a first heat distribution device 180. In this embodiment, the flame flow 70 is formed with a second heat distribution device 182 that is constructed by extending a pipe 184 from the third opening 164 in the bottom 44 of the copper pot 12. The pipe 184 is attached to an elbow connector 186. The elbow connector 186 is attached to a connector pipe 188 that extends an adequate length to connect with a second elbow connector 190. The second elbow connector 190 is connected to a second pipe 192 that extends from and is attached to the fourth opening 166 in the bottom 44 of the copper pot 12. Either or both heat distribution devices may have an exhaust tube 72. In a preferred embodiment, only one of the heat distribution devices has an exhaust tube 72 which in the embodiment as shown is the second heat distribution device 182 not the first heat distribution device 180. As shown in a top view in FIG. 13C, the exhaust tube 72 is inserted through an opening and sealed to the connector pipe 188 along a side surface of the pipe 188 in order to extend at an angle from the pipe 188 and mate with the cone shaped surface of the cover 24. Joint fittings 90 are brazed at each connection to seal the flame flow heat distribution device 70 and prevent leaking from the interior through the bottom of the copper pot 12.

Figure 14:
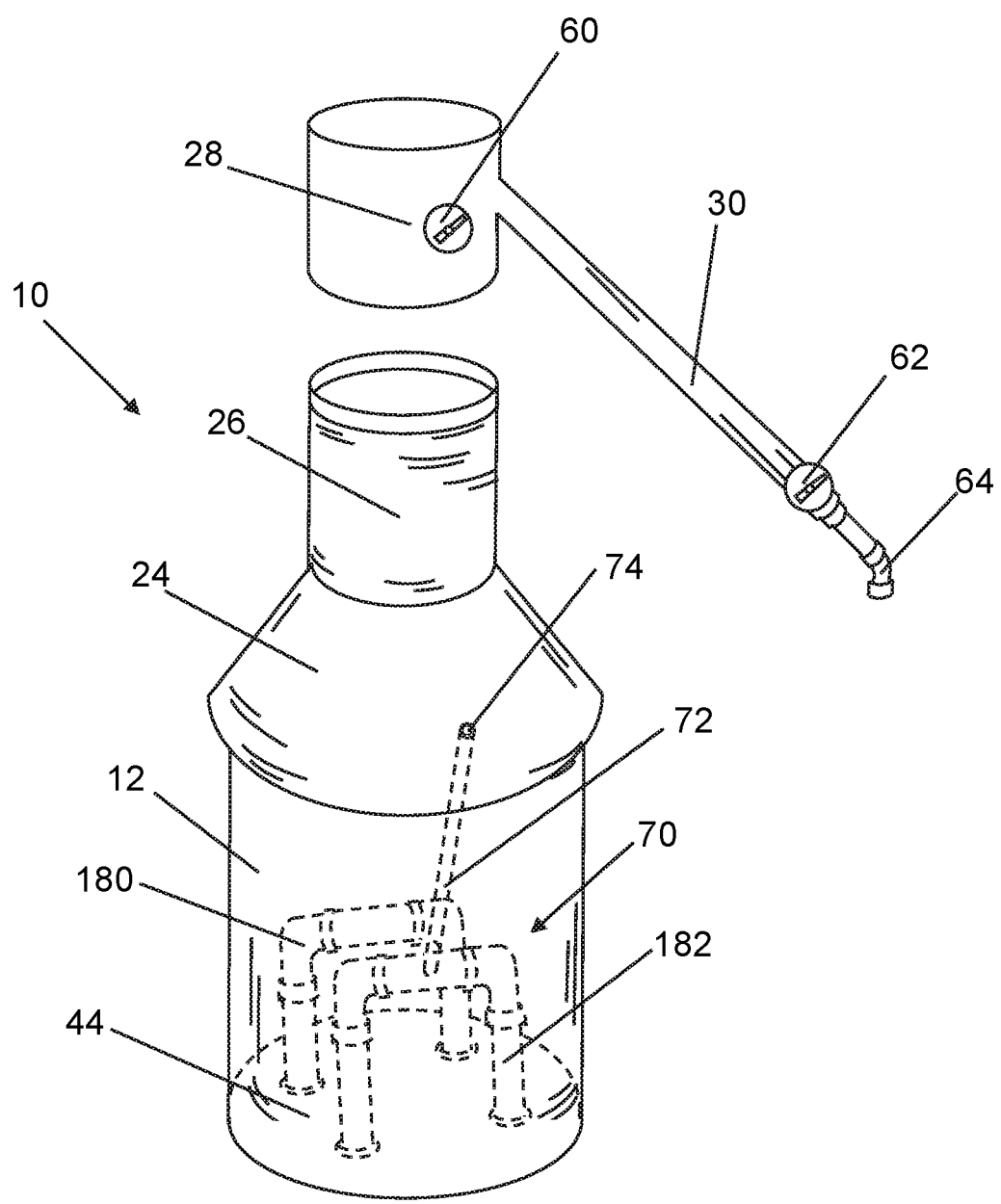
FIG. 14 is a diagrammatic representation of the embodiment of the flame flow heat distribution device of the present invention of FIGS. 13A-13C used with a distillation apparatus of the copper pot type.

As shown in FIG. 14, the exhaust tube 72 from the second heat distribution device 182 is brazed and sealed to the cover 24 with an outlet 74 extending through the cover 24 providing for heated air, flames, smoke or other gases to be drawn through the second flame flow heat distribution device 182, through the exhaust tube 72 and out through the outlet 74. The drawing of heat by the exhaust tube 72 provides for heating the second heat distribution device 182 more rapidly than the first heat distribution device 180 without an exhaust tube 72. The difference in temperature between the first heat distribution device 180 and second heat distribution device 182 and the different rates of heating causes fluid currents that move the contents within the distillation apparatus 10 thereby heating the contents faster and preventing scorching even when heat is rapidly applied from the heating element. This embodiment of the flame flow heat distribution device 70 also provides for better control and maintaining the contents within acceptable temperature ranges for more thorough evaporation. This unique heat distribution device 70 improves the efficiency and quality of water purification and the production of potable spirits and essential oils.

Although specific embodiments of the invention have been disclosed herein in detail, it is to be understood that this is for purposes of illustration. This disclosure is not to be construed as limiting the scope of the invention, since the described embodiments may be changed in details as will become apparent to those skilled in the art in order to adapt the flame flow heat distribution device of the present invention to particular applications, without departing from the scope of the following claims and equivalents of the claimed elements.

What is claimed is:

1. A heat distribution device for a distillation apparatus, comprising:
   a first heat distribution device;
   a second heat distribution device formed as a pipe and having an exhaust tube connected through a side surface of the pipe and extending through an outlet in the distillation apparatus; and
   wherein the exhaust tube is configured to draw heat from a heating element through the second heat distribution device formed as a pipe.

2. The heat distribution device for a distillation apparatus of claim 1 wherein the first heat distribution device is attached to a first opening in a bottom of a distillation apparatus and extends to a second opening in the bottom of the distillation apparatus; and
   the second heat distribution device is attached to a third opening in the bottom of the distillation apparatus and extends to a fourth opening in the bottom of the distillation apparatus.

3. The heat distribution device for a distillation apparatus of claim 2 wherein the heat distribution devices seal contents within the distillation apparatus from the openings in the bottom of the distillation apparatus.

4. The heat distribution device for a distillation apparatus of claim 1 wherein the first and second heat distribution devices are hollow.

5. The heat distribution device for a distillation apparatus of claim 1 wherein the exhaust tube extends from the second heat distribution device through a cover of the distillation apparatus.

6. The heat distribution device for a distillation apparatus of claim 1 wherein heating the distillation apparatus heats the first heat distribution device at a different rate and to a different temperature than the second heat distribution device having an exhaust tube thereby creating fluid currents.

7. The heat distribution device for the distillation apparatus of claim 6 wherein fluid currents move contents within the distillation apparatus.

8. The heat distribution device for the distillation apparatus of claim 7 wherein the movement of the contents prevents scorching of the contents in the distillation apparatus.

9. The heat distribution device for the distillation apparatus of claim 1 wherein the first and second heat distribution devices transfer heat through contents of the distillation apparatus for faster heating of the contents than heating the contents in the distillation apparatus without the first and second heat distribution devices.

10. A method of distributing heat in a distillation apparatus, comprising:
    attaching a first end of a first heat distribution device to a first opening in a bottom of a distillation apparatus;
    attaching a second end of the first heat distribution device to a second opening in the bottom of the distillation apparatus;

attaching a first end of a second heat distribution device to a third opening in the bottom of the distillation apparatus;

attaching a second end of the second heat distribution device to a fourth opening in the bottom of the distillation apparatus;

extending an exhaust tube from a side of the second heat distribution device to an outlet in the distillation apparatus, the exhaust tube configured to draw heat from a heating element through the second heat distribution device.

11. The method of distributing heat in a distillation apparatus of claim 10 comprising:

heating the bottom of a distillation apparatus on a heating element causing the first heat distribution device to heat at a different rate and to a different temperature than the second heat distribution device having the exhaust tube thereby creating fluid currents.

12. The method of distributing heat in a distillation apparatus of claim 11, comprising:

moving contents of the distillation apparatus by the fluid currents created thereby preventing scorching of the contents.

13. The method of distributing heat in the distillation apparatus, of claim 10, comprising:

transmitting heat from the surface area of the first and second heat distribution devices to contents within the distillation apparatus thereby heating the contents more rapidly than in the distillation apparatus without the first and second heat distribution devices.

14. A heat distribution device for a distillation apparatus, comprising:

at least one hollow heat distribution device extending through the bottom of a distillation apparatus, the heat distribution device configured to transfer heat to contents of the distillation apparatus;

an exhaust tube connected through a side surface of the at least one hollow heat distribution device and the exhaust tube extending through a sidewall of the distillation apparatus.

15. The heat distribution device for a distillation apparatus of claim 14 wherein the exhaust tube of the at least one hollow heat distribution device is configured to draw exhaust from a heating element through the at least one heat distribution device.

16. The heat distribution device for a distillation apparatus of claim 14 wherein the at least one hollow heat distribution device extends from a first opening through a bottom of the distillation apparatus to a second opening through the bottom of the distillation apparatus.

17. The heat distribution device for the distillation apparatus of claim 14 further comprising a plurality of heat distribution devices extending from and to openings in the distillation apparatus.

18. The heat distribution device for the distillation apparatus of claim 14 wherein the hollow heat distribution device is shaped as a coil configured for attachment to a propane burner.

* * * * *